United States Patent Office 3,082,832
Patented Mar. 26, 1963

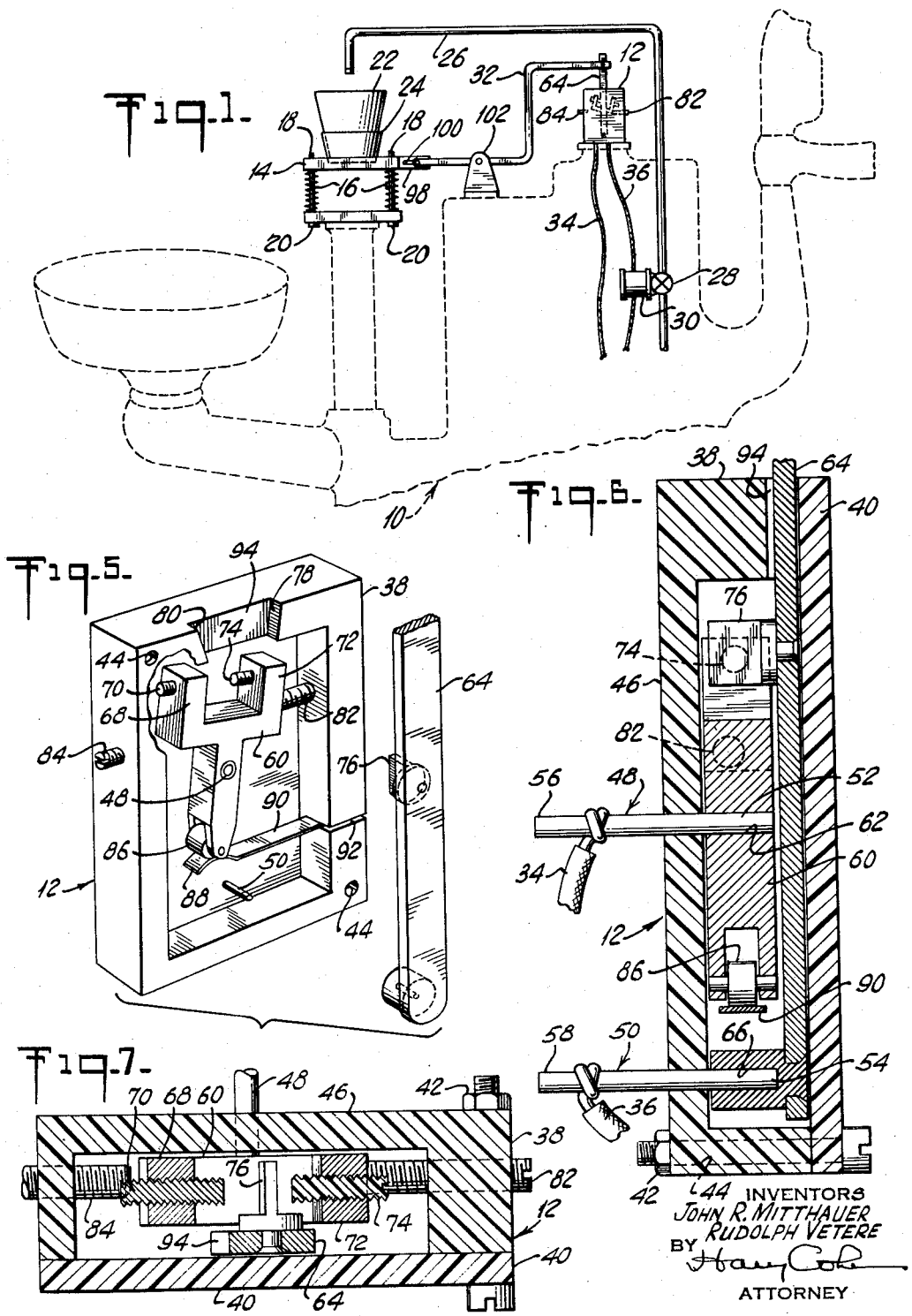

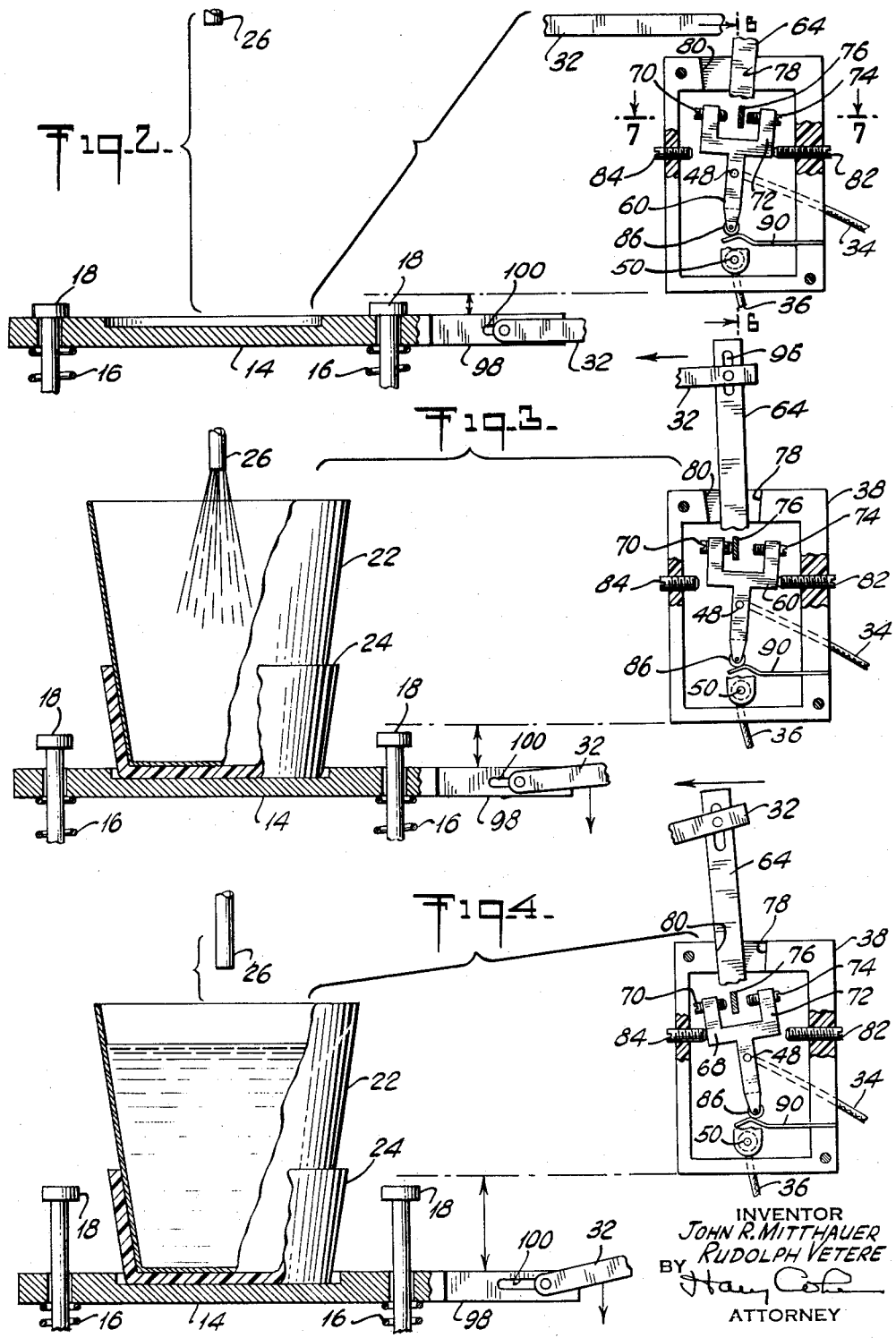

3,082,832
WEIGHT-RESPONSIVE SWITCH
John R. Mitthauer, 630 Victory Blvd., and Rudolph Vetere, 49 Sheridan Ave., both of Staten Island, N.Y.
Filed Mar. 17, 1960, Ser. No. 15,589
11 Claims. (Cl. 177—117)

This invention relates to a device for automatically controlling the flow of liquid to a container for the filling thereof and, more particularly, to an electric switch responsive to the weight of the container and its contents and operable to control valve means which controls the flow of liquid to said container.

Heretofore, in devices for controlling the flow of liquid to a container for the automatic filling thereof, such as a patient's cup which is mounted on a spring supported platform of a dental unit, upon placing of the empty cup by the dentist on said platform, a solenoid operated valve is actuated and opens to permit the flow of liquid into the cup. As the liquid flows into the cup, the spring supported platform moves downwardly under the weight of the container and the liquid therein until the platform reaches a lowermost position, whereupon the solenoid operated valve closes and the flow of liquid to the cup stops. The filled cup is then removed by the patient as needed but upon removal the spring supported platform moves upwardly under the biasing action of the springs and causes the device for operating the solenoid actuated valve to move back into its initial position. During this return movement the device momentarily opens the solenoid actuated valve and causes a spurt of liquid to fall onto the platform.

One of the objects of the present invention is to provide means for automatically controlling the flow of liquid to a container for the filling thereof whereby the container is automatically filled with liquid after being placed on a movable support and, upon removal of the filled container from said support, no liquid is caused to flow during said removal.

Another object is to provide improved switch means which is actuated upon movement of a member in one direction and which is not actuated upon movement of said member in an opposite direction.

A further object is to provide improved apparatus for the automatic filling of a container with liquid.

The above and other objects, features and advantages of this invention will be fully understood from the following description considered in connection with the accompanying illustrative drawings of the presently preferred embodiment of this invention.

In the drawings:

FIG. 1 is a diagrammatic illustration of part of a dental unit embodying the present invention, said dental unit being shown in broken lines with the supporting platform thereof being shown in solid lines;

FIG. 2 is a vertical view, partly in section and with parts omitted, illustrating the initial positions of the cup supporting platform and the switch of the present invention before a cup is placed on said platform;

FIG. 3 is a view similar to FIG. 2 illustrating an intermediate position of the platform and the positions of the parts of the switch when an empty cup and its holder are placed on said platform;

FIG. 4 is a view similar to FIG. 3 illustrating the lowermost position of said platform and the positions of the parts of the switch when the cup is filled with liquid;

FIG. 5 is an exploded perspective view of some of the parts of the switch of the present invention, illustrating said parts in a disassembled condition;

FIG. 6 is a sectional view, on a larger scale taken on line 6—6 of FIG. 2; and

FIG. 7 is a sectional view, on a larger scale, taken on line 7—7 of FIG. 2.

Referring now to the drawings in detail and particularly to FIG. 1, there is shown a dental unit 10 having the switch device 12 of the present invention suitably supported thereon. The dental unit includes a cup supporting platform 14 which is supported by springs 16 and is mounted for vertical movement on rods 18 which are suitably connected at their lower ends 20 to dental unit 10.

Platform 14 is adapted to support a patient's cup 22 and its holder 24 which are placed on the platform for the filling of the cup with liquid. The liquid is supplied to the cup from a conduit 26 which is provided with a normally closed valve 28, said valve being operated by a solenoid 30. The operation of solenoid 30 is controlled by switch 12, pursuant to the invention, and the switch is connected to platform 14 by link 32. The parts of the switch are movable in response to the vertical movements of said platform, as will be fully described hereinafter.

Briefly described, platform 14 has three positions. A first uppermost position determined by the absence of cup 22 and its holder 24. A second intermediate and lower position determined by the weight of an empty cup and its holder when placed on said platform, and a third and lowermost position determined by the weight of cup 22, filled with liquid, and the weight of holder 24. Upon placing an empty cup and its holder on platform 14, said platform moves from its first uppermost position to its second intermediate position and said movement actuates switch 12 which causes valve 28 to open to initiate the filling of the cup with liquid, switch 12 being connected to solenoid 30 via wires 34 and 36. As cup 22 fills with liquid, platform 14 moves downwardly into its third and lowermost position where, in said position, cup 22 is completely filled with liquid and switch 12 is actuated by said movement to close valve 28 and stop the flow of liquid to said cup. Upon removal of the filled cup and its holder from platform 14, said platform moves upwardly under the biasing force of springs 16 from its third position to its first position and during said movement the members of switch 12 move back to their initial position without actuating solenoid 30 and causing a spurt of liquid to fall on said platform because valve 28 is momentarily opened, as was the case heretofore. The foregoing action and movements will be more fully explained hereinafter.

Referring now to FIGS. 5, 6 and 7, switch 12 comprises a housing 38 which is made of a suitable non-electrically conducting material and is provided with a cover 40 which is made preferably of a transparent plastic material. The cover is secured to housing 38 by screw and nut assemblies 42, said housing being provided with holes 44 for receiving two of said assemblies. Housing 38 includes a base or wall 46 which supports electrically conducting pins 48 and 50 which are in vertical alignment with each other and are spaced vertically from each other, as shown. Each of said pins has a part 52 and 54, respectively, which project forwardly of base 46 into housing 38 and which provide a pivot mount. Pins 48 and 50 are each provided with a part 56 and 58, respectively, which provide a terminal for wires 34 and 36 respectively.

A Y-shaped member 60 is mounted for pivotal movement on part 52 of pin 48, said member being provided with an aperture 62 for receiving said part. An elongated member or lever 64 overlies member 60 and is mounted for pivotal movement on part 54 of pin 50, member 64 being provided with an aperture 66 at its lower end into which part 54 of pin 50 projects. Arm 68 of member 60 is provided with an electrically conducting contact part 70 which is constituted by a threaded metal screw and arm 72 of member 60 is provided with a non-electrically conducting part 74 which is constituted by a plastic screw.

Member 64 is provided with an electrically conducting contact part 76 which is disposed between parts 70 and 74 of member 60, the last mentioned parts being in the path of movement of said contact part 76. Members 60 and 64 are each made of electrically conducting material, for example a suitable metal, so that when contact part 76 engages contact part 70 an electrical circuit is completed between pins 48 and 50, it being understood that member 60 is in surface-to-surface contact with part 52 of pin 48 and member 64 is in surface-to-surface contact with part 54 of pin 50. Completion of the foregoing circuit energizes solenoid 30, via wires 34 and 36, to open valve 28 and permit the flow of liquid through conduit 26 into cup 22.

The upper part of housing 38 is provided with stops 78 and 80 which determine the extreme right and left positions of link 64, respectively, as viewed in FIG. 5. Housing 38 is also provided with threaded pins 82 and 84, of a suitable non-electrically conducting material, which provide adjustable stops for the extreme right and left positions, respectively, of member 60. The lower end of member 60 is provided with a roller 86 which engages the inverted V-shaped end portion 88 of spring member 90, said spring member being mounted in the slot 92 of housing 38. Spring 90 furnishes a biasing force on member 60 which provides a snap action to the movement of said member when the latter is near its extreme right or left positions, as will be more fully understood hereinafter.

Lever 64 extends upwardly of housing 38 through opening 94 and is connected to one end of link 32, as shown in FIG. 1, and for this purpose the upper end of lever 64 is provided with an elongated slot 96. The other end of link 32 is connected to platform 14, as previously mentioned, and for this purpose said platform is provided with an extension 98 having an elongated slot 100 therein to receive said other end of the link. Link 32 is mounted for pivotal movement at stationary support 102 which is fixed to the dental unit 10.

Referring now to FIGS. 2, 3 and 4, FIG. 2 shows the position of platform 14 and the parts of switch 12 when no cup is placed on said platform and said platform is in its first or uppermost position. In said position, lever 64 is in its extreme right position against stop 78 and member 60 is in its extreme right position with arm 72 against stop 82, it being understood that the aforesaid positions of members 64 and 60 correspond to the first or uppermost position of platform 14. In this position of the platform, contact part 76 of member 64 is disposed between parts 70 and 74 of member 60 and is disengaged from said last mentioned parts so that solenoid 30 remains deenergized and valve 28 remains closed.

When cup 22 and its holder 24 are placed on platform 14, the positions of said platform and the various parts of switch 12 are as shown in FIG. 3. More particularly, due to the weight of empty cup 22 and its holder 24, platform 14 moves downwardly to the position shown, compressing springs 16 and, due to the connection of link 32 between lever 64 and platform 14, said lever moves to the left to a near vertical position and contact part 76 of said lever engages contact part 70 of member 60 to complete a circuit between members 64 and 60 and energize solenoid 30. Upon energization of said solenoid, valve 28 opens permitting the flow of liquid through conduit 26 to initiate the filling of cup 22 with said liquid. As cup 22 fills with liquid, platform 14 continues to move downwardly under the increased weight of the liquid and said movement causes lever 64 to move further to the left which causes member 60 to pivot about pin 48 in a counterclockwise direction, as viewed in FIG. 3, and contact part 70 of said member moves to the left together with contact part 76 of member 64, and solenoid 30 remains energized.

When cup 22 is filled with liquid and platform 14 is in its third and lowermost position, lever 64 will be in its extreme left position against stop 80, as shown in FIG. 4. As lever 64 moves into the aforesaid position, roller 86 of member 60 passes to the right of the apex of V-shaped end portion 88 of spring 90, as viewed in FIG. 4, and the biasing force of said end portion causes roller 86 and the lower end of member 60 to move quickly to the right causing contact part 70 of member 60, in a quick snap action, to move away from contact part 76 of lever 64 and arm 68 engages stop member 84, whereby the described counterclockwise snap movement of member 60 stops. Upon disengagement of contact parts 70 and 76 from each other, solenoid 30 is deenergized and valve 28 closes to stop the flow of liquid into cup 22. Member 60 is now in its left position as is member 64 and contact 76 of the latter is disengaged from parts 70 and 74 of member 60, as shown in FIG. 4.

When the filled cup 22 and its holder 24 are removed from platform 14, said platform moves from its third or lowermost position upwardly and returns to its first initial position under the biasing force of compressed springs 16. This movement causes lever 64 to move from its left position, as shown in FIG. 4, to its right position, as shown in FIG. 2, and during this movement member 60 moves in a clockwise direction from its left position, as shown in FIG. 4, to its right position, as shown in FIG. 2, and during this movement member 60 moves in a clockwise direction from its left position, as shown in FIG. 4, to its right position, as shown in FIG. 2. More particularly, as lever 64 moves toward the right during the upward movement of platform 14, into a near vertical position, contact part 76 thereof engages non-electrically conducting part 74 of member 60 causing said member to pivot clockwise as viewed in FIG. 4. Since part 74 is made of non-electrically conducting material no circuit is completed to solenoid 30 upon engagement of parts 74 and 76 and valve 28 remains closed during the upward movement of platform 14. As lever 64 reaches its right position and engages stop 78 roller 86 has moved to the left, passed the apex of portion 88 of spring 90, so that the biasing force of said spring causes a quick movement of roller 86 and the lower part of member 60 to the left, causing part 74 of said member to move quickly with a snap action to the right disengaging itself from contact part 76. This clockwise snap movement of member 60 is stopped when arm 72 thereof engages stop 82 and the parts of the switch are again in their initial positions which are shown in FIG. 2.

From the foregoing it will be seen that when the filled cup is removed from the supporting platform 14, the parts of switch 12 move in a direction which is opposite to their movements during the placing of a cup on said platform and the filling of said cup with liquid, and this opposite movement is such as to preclude the completion of a circuit to solenoid 30 so that valve 28 remains closed during the removal of the filled cup from the supporting platform. More particularly, when member 60 is snapped into its right position by the action of spring 90, wherein part 74 is disengaged from contact part 76, contact part 70 of member 60 does not engage contact part 76 of lever 64 because said lever is in or near its right position, as shown in FIG. 2, and contact part 76 is too far ahead of contact part 70 so that the latter does not engage part 76 during the clockwise snapping movement of member 60. Accordingly, during the removal of filled cup 22 the parts of switch 12 return to their initial position, as shown in FIG. 2, and solenoid 30 remains deenergized and valve 28 remains closed. Upon placing an empty cup on platform 22 the liquid filling cycle is again initiated.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A weight-responsive switch, comprising a supporting base, a first electrically conducting contact member mounted on said base and movable in response to the movement of a weight-actuated member, a second member mounted on said base and movable to first and second positions, said second member having an electrically conducting contact part and a non-electrically conducting part, said last mentioned parts being in the path of movement of said first electrically conducting contact member, so that upon movement thereof in one direction said first member engages said electrically conducting contact part of said second member to complete a circuit therethrough and move said second member into said first position, and upon movement of said first member in an opposite direction the latter engages said non-electrically conducting part of said second member to move said second member into said second position without an electrical circuit being completed through said first and second members.

2. A weight-responsive switch, comprising a supporting base, a first electrically conducting contact member mounted on said base and movable in response to the movement of a weight-actuated member, a second member mounted on said base and movable to first and second positions, said second member having an electrically conducting contact part and a non-electrically conducting part, said last mentioned parts being in the path of movement of said first electrically conducting contact member, so that upon movement thereof in one direction said first member engages said electrically conducting contact part of said second member to complete a circuit therethrough and move said second member into said first position, and upon movement of said first member in an opposite direction the latter engages said non-electrically conducting part of said second member to move said second member into said second position without an electrical circuit being completed through said first and second members, and means for disengaging said electrically and non-electrically conducting parts, respectively, from said first member during the movement thereof and for moving said second member into said first and second positions, respectively.

3. A weight-responsive switch, comprising a supporting base, a first electrically conducting contact member mounted on said base and movable in response to the movement of a weight-actuated member, a second member mounted on said base and movable to first and second positions, said second member having an electrically conducting contact part and a non-electrically conducting part, said last mentioned parts being in the path of movement of said first electrically conducting contact member, so that upon movement thereof in one direction said first member engages said electrically conducting contact part of said second member to complete a circuit therethrough and move said second member into said first position, and upon movement of said first member in an opposite direction the latter engages said non-electrically conducting part of said second member to move said second member into said second position without an electrical circuit being completed through said first and second members, and means for disengaging said electrically and non-electrically conducting parts, respectively, from said first member during the movement thereof and for moving said second member into said first and second positions, respectively, said last mentioned means comprising a spring in biasing relation with said second member.

4. A weight-responsive switch, comprising a base, first and second pivot pins projecting from said base, a first member mounted for pivotal movement on said first pin, a second member mounted for pivotal movement on said second pin, said first member overlying said second member and being movable in response to the movement of a weight-actuated member, said second member having an electrically conducting contact part and a non-electrically conducting part, said first member having an electrically conducting contact part disposed between said parts of said second member, so that said parts of said second member are in the path of movement of said contact part of said first member for engagement thereby for actuating said second member into first and second positions.

5. A weight-responsive switch, comprising a base, first and second pivot pins projecting from said base, a first member mounted for pivotal movement on said first pin, a second member mounted for pivotal movement on said second pin, said first member overlying said second member and being movable in response to the movement of a weight-actuated member, said second member having an electrically conducting contact part and a non-electrically conducting part, said first member having an electrically conducting contact part disposed between said parts of said second member, so that said parts of said second member are in the path of movement of said contact part of said first member for engagement thereby for actuating said second member into first and second positions, said first and second pivot pins and said first and second members being electrically conducting, so that an electrically conducting circuit is completed through said pins when the contact part of said first member engages said electrically conducting contact part of said second member.

6. A weight-responsive switch, comprising a base, first and second pivot pins projecting from said base, a first member mounted for pivotal movement on said first pin, a second member mounted for pivotal movement on said second pin, said first member overlying said second member and being movable in response to the movement of a weight-actuated member, said second member having an electrically conducting contact part and a non-electrically conducting part, said first member having an electrically conducting contact part disposed between said parts of said second member, so that said parts of said second member are in the path of movement of said contact part of said first member for engagement thereby for actuating said second member into first and second positions, said first and second pivot pins and said first and second members being electrically conducting, so that an electrically conducting circuit is completed through said pins when the contact part of said first member engages said electrically conducting contact part of said second member, and means for disengaging said parts, respectively, of said second member from said contact part of said first member during the movement thereof and for moving said second member into said first and second positions, respectively, said parts of said second member being disengaged from said contact part of said first member when said second member is in either of said first or second positions.

7. A weight-responsive switch for controlling the flow of liquid to a container which is placed on a movable support for the filling of said container, said support being movable from a first uppermost position where said container is not on said support, to an intermediate second position determined by the weight of an empty container placed on said support, and to a third lowermost position determined by the weight of said container filled with liquid, said weight-responsive switch comprising a first member adapted to be connected to said movable support and being movable in response to the movements of said support to positions corresponding to said positions of said support, said first member having an electrically conducting contact part, a second member having an electrically conducting contact part and a non-electrically conducting part, said last mentioned parts being in the path of movement of said contact part of said first member, said contact part of said first member being disengaged from said parts of said second member when said support is in said first or third positions, so that upon placing an empty container on said support said first member moves from said first position thereof into said second position thereof and said contact part of said first member moved into engagement with said electrically conducting contact part of said second member to complete a circuit therethrough for actuating valve means to cause the flow of liquid into said container, and upon filling of said container said first member moves into said third position thereof and the contact part thereof disengages said contact part of said second member to break the circuit therebetween and stop the flow of liquid to said container, and during removal of said filled container from said support said first member moves from said third position thereof to said first position thereof and engages said non-electrically conducting part of said second member without completing a circuit therethrough, whereby the flow of liquid to said container remains stopped.

8. A weight-responsive switch for controlling the flow of liquid to a container which is placed on a movable support for the filling of said container, said support being movable from a first uppermost position where said container is not on said support, to an intermediate second position determined by the weight of an empty container placed on said support, and to a third lowermost position determined by the weight of said container filled with liquid, said weight-responsive switch comprising a first member adapted to be connected to said movable support and being movable in response to the movements of said support to positions corresponding to said positions of said support, said first member having an electrically conducting contact part, a second member having an electrically conducting contact part and a non-electrically conducting part, said last mentioned parts being in the path of movement of said contact part of said first member, said second member being movable from a first position to a second position corresponding to said first and third positions of said movable support, respectively, said contact part of said first member being disengaged from said parts of said second member when said support is in said first or third positions, and when said second member is in said first or second positions thereof, respectively, so that upon placing an empty container on said support said first member moves from said first position thereof into said second position thereof and said contact part of said first member moves into engagement with said electrically conducting contact part of said second member to complete a circuit therethrough for actuating valve means to cause the flow of liquid into said container, and to move said second member from said first position thereof, and upon filling of said container said first member moves into said third position thereof and the contact part thereof disengages said contact part of said second member when said second member is in said second position thereof to break the circuit therebetween and stop the flow of liquid to said container, and during removal of said filled container from said support said first member moves from said third position thereof to said first position thereof and engages said non-electrically conducting part of said second member without completing a circuit therethrough, and moves said second member from said second position thereof back to said first position thereof, whereby the flow of liquid to said container remains stopped.

9. Apparatus for automatically filling a container with a liquid, comprising a support for said container movable in response to the weight applied thereon, said support having a first uppermost position when no container is thereon, a second intermediate position when an empty container is thereon, and a third lower position when a filled container is thereon, solenoid operated valve means for controlling the flow of liquid to said container for the filling thereof, and means responsive to said movements of said support for controlling the operation of said valve means, said last mentioned means including means for opening said valve means when an empty container is placed on said support for the filling thereof and for closing said valve means when said container is filled with liquid and for keeping said valve means closed during the removal of said filled container from said support and the return of said support to said first position comprising a first member connected to said support and movable in response to the movements of said support into positions corresponding to said positions of said support, and a second member movable in response to the movements of said first member, said first member having an electrically conducting contact part, said second member having an electrically conducting contact part and a non-electrically conducting part, said last mentioned parts being in the path of movement of said contact part of said first member.

10. An electrical switch, comprising a first movable electrically conducting member adapted to be connected to movable means for movement in response to the movement of said means, a second electrically conducting movable member provided with an electrically conducting part positioned in the path of movement of said first member in one direction and thereby engageable by the latter during its movement in said one direction to complete an electrical circuit through said first and second members and to concurrently move said second member toward a first position, said second member being provided with a non-electrically conducting part positioned in the path of movement of said first member in another direction and thereby engageable by the latter during its movement in said other direction to concurrently move said second member toward a second position without completing an electrical circuit through said first and second members.

11. An electrical switch, comprising a first movable electrically conducting member adapted to be connected to movable means for movement in response to the movement of said means, a second electrically conducting movable member provided with an electrically conducting part positioned in the path of movement of said first member in one direction and thereby engageable by the latter during its movement in said one direction to complete an electrical circuit through said first and second members and to concurrently move said second member toward a first position, said second member being provided with a non-electrically conducting part positioned in the path of movement of said first member in another direction and thereby engageable by the latter during its movement in said other direction to concurrently move said second member toward a second position without completing an electrical circuit through said first and second members, and means for moving said second member into said first and second positions, respectively, to disengage said second member from said first member.

References Cited in the file of this patent

UNITED STATES PATENTS

| | | |
|---|---|---|
| 2,395,674 | Lauterbach | Feb. 26, 1946 |
| 2,439,509 | Eddy | Apr. 13, 1948 |
| 2,441,501 | Miller | May 11, 1948 |
| 2,828,935 | Ziegler et al. | Apr. 1, 1958 |